United States Patent
Kim et al.

(10) Patent No.: US 9,246,140 B2
(45) Date of Patent: *Jan. 26, 2016

(54) RECHARGEABLE BATTERY WITH A CAP ASSEMBLY HAVING A FIRST TAB LOCATED OUTSIDE OF THE CASE

(75) Inventors: Yong-Sam Kim, Suwon-si (KR); Sang-Won Byun, Suwon-si (KR); Hyo-Seob Kim, Suwon-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 19 days.

This patent is subject to a terminal disclaimer.

(21) Appl. No.: 12/626,582

(22) Filed: Nov. 25, 2009

(65) Prior Publication Data

US 2010/0279156 A1  Nov. 4, 2010

Related U.S. Application Data (60) Provisional application No. 61/224,392, filed on Jul. 9, 2009.

(51) Int. Cl.
*H01M 2/04* (2006.01)
*H01M 2/02* (2006.01)
*H01M 2/06* (2006.01)
*H01M 2/08* (2006.01)
(Continued)

(52) U.S. Cl.
CPC .......... *H01M 2/0404* (2013.01); *H01M 2/0473* (2013.01); *H01M 2/0486* (2013.01); *H01M 2/06* (2013.01); *H01M 2/08* (2013.01); *H01M 2/1241* (2013.01); *H01M 2/30* (2013.01); *H01M 2/34* (2013.01); *H01M 2/345* (2013.01); *H01M 10/42* (2013.01); *H01M 2/0217* (2013.01)

(58) Field of Classification Search
CPC ... H01M 2/0404; H01M 2/0473; H01M 2/0486
USPC ...................................... 429/57–59
See application file for complete search history.

(56) References Cited

U.S. PATENT DOCUMENTS 4,209,571 A   6/1980  Bessett et al.
4,945,014 A * 7/1990  Miyabayashi et al. ... 429/231.95
(Continued)

FOREIGN PATENT DOCUMENTS

CN   1395328 A   2/2003
CN   1481039 A   3/2004
(Continued)

OTHER PUBLICATIONS

Machine Translation for Kobayashi et al., JP 11-040203 A.*
(Continued)

*Primary Examiner* — Edu E Enin-Okut
(74) *Attorney, Agent, or Firm* — Christie, Parker & Hale, LLP (57) ABSTRACT

A rechargeable battery includes an electrode assembly, a case containing the electrode assembly and a cap assembly coupled to the case. The electrode assembly includes a first electrode, a second electrode, and a separator between the first electrode and the second electrode. The cap assembly includes a cap plate and a deformable plate attached to the cap plate and configured to deform in response to an increase in pressure inside the case to electrically couple the first electrode and the second electrode to each other.

12 Claims, 6 Drawing Sheets

(51) Int. Cl.
  *H01M 2/12* (2006.01)
  *H01M 2/30* (2006.01)
  *H01M 2/34* (2006.01)
  *H01M 10/42* (2006.01)

(56) References Cited

U.S. PATENT DOCUMENTS

| | | |
|---|---|---|
| 5,143,860 A | 9/1992 | Mitchell et al. |
| 5,523,178 A | 6/1996 | Murakami et al. |
| 5,707,756 A | 1/1998 | Inoue et al. |
| 5,766,793 A | 6/1998 | Kameishi et al. |
| 5,800,937 A | 9/1998 | Decker et al. |
| 6,005,469 A | 12/1999 | Kalapodis et al. |
| 6,083,792 A | 7/2000 | Sung |
| 6,143,440 A | 11/2000 | Volz et al. |
| 6,342,826 B1 * | 1/2002 | Quinn et al. ............ 429/62 |
| 6,399,237 B1 | 6/2002 | Souliac et al. |
| 6,403,250 B1 | 6/2002 | Azema et al. |
| 6,509,115 B2 | 1/2003 | Kim et al. |
| 6,525,371 B2 | 2/2003 | Johnson et al. |
| 6,562,493 B2 | 5/2003 | Tsukada et al. |
| 6,642,110 B2 | 11/2003 | Jung et al. |
| 6,753,104 B2 | 6/2004 | Kitoh |
| 6,899,972 B2 | 5/2005 | Cho |
| 7,351,496 B2 | 4/2008 | Nakanishi et al. |
| 7,601,455 B2 * | 10/2009 | Yoon ............................. 429/72 |
| 7,666,544 B2 | 2/2010 | Barrault et al. |
| 8,043,737 B2 | 10/2011 | Kim |
| 8,415,052 B2 | 4/2013 | Yoshida et al. |
| 2002/0052080 A1 | 5/2002 | Lee |
| 2002/0142543 A1 | 10/2002 | Lin et al. |
| 2003/0013005 A1 | 1/2003 | Chang |
| 2003/0027036 A1 | 2/2003 | Emori et al. |
| 2003/0027044 A1 | 2/2003 | Asahina et al. |
| 2003/0151868 A1 | 8/2003 | Inae et al. |
| 2004/0092167 A1 | 5/2004 | Barrault et al. |
| 2004/0126650 A1 | 7/2004 | Kim |
| 2004/0170887 A1 | 9/2004 | Masumoto et al. |
| 2004/0234842 A1 | 11/2004 | Kawano et al. |
| 2005/0112455 A1 | 5/2005 | Marubayashi et al. |
| 2005/0112456 A1 | 5/2005 | Kozu et al. |
| 2005/0124133 A1 | 6/2005 | Tu |
| 2005/0269622 A1 | 12/2005 | Klinger et al. |
| 2006/0099500 A1 | 5/2006 | Jeon |
| 2007/0077706 A1 | 4/2007 | Orlowski et al. |
| 2007/0122691 A1 | 5/2007 | Lee et al. |
| 2007/0166605 A1 | 7/2007 | Meguro et al. |
| 2007/0182020 A1 | 8/2007 | Trezza et al. |
| 2007/0212595 A1 | 9/2007 | Kim et al. |
| 2007/0269711 A1 | 11/2007 | Meguro et al. |
| 2008/0070067 A1 | 3/2008 | Jang et al. |
| 2008/0145748 A1 | 6/2008 | Jung |
| 2008/0213657 A1 | 9/2008 | Qi et al. |
| 2009/0087733 A1 | 4/2009 | Yoon et al. |
| 2009/0305126 A1 | 12/2009 | Choi et al. |
| 2010/0028762 A1 | 2/2010 | Yokoyama et al. |
| 2010/0081048 A1 | 4/2010 | Nansaka et al. |
| 2010/0136388 A1 | 6/2010 | Kim et al. |
| 2010/0167107 A1 | 7/2010 | Byun et al. |
| 2010/0227205 A1 | 9/2010 | Byun et al. |
| 2010/0279156 A1 | 11/2010 | Kim et al. |
| 2010/0291421 A1 | 11/2010 | Byun et al. |
| 2011/0039136 A1 | 2/2011 | Byun et al. |
| 2011/0052949 A1 | 3/2011 | Byun et al. |
| 2011/0135976 A1 | 6/2011 | Byun |
| 2011/0136004 A1 | 6/2011 | Kwak et al. |
| 2011/0177387 A1 | 7/2011 | Byun et al. |
| 2011/0183193 A1 | 7/2011 | Byun et al. |
| 2011/0244280 A1 | 10/2011 | Byun et al. |

FOREIGN PATENT DOCUMENTS

| | | | | |
|---|---|---|---|---|
| EP | 0 313 405 A1 | 4/1989 | | |
| EP | 1 076 350 A2 | 2/2001 | | |
| EP | 1 717 886 A2 | 11/2006 | | |
| EP | 1 901 369 A1 | 3/2008 | | |
| EP | 2 284 932 A1 | 2/2011 | | |
| EP | 2 287 942 A1 | 2/2011 | | |
| EP | 2 299 512 A1 | 3/2011 | | |
| EP | 2 333 871 A1 | 6/2011 | | |
| EP | 2 348 558 A1 | 7/2011 | | |
| EP | 2 357 685 A1 | 8/2011 | | |
| JP | 05-062664 | 3/1993 | | |
| JP | 05-251290 | 9/1993 | | |
| JP | 05-275088 | 10/1993 | | |
| JP | 06-290767 | 10/1994 | | |
| JP | 07-037572 | 2/1995 | | |
| JP | 07-201372 | 8/1995 | | |
| JP | 08-050920 | 2/1996 | | |
| JP | 08-185850 | 7/1996 | | |
| JP | 09-106804 | 4/1997 | | |
| JP | 10074500 A * | 3/1998 | ............ | H01M 2/12 |
| JP | 10-188946 | 7/1998 | | |
| JP | 10-208725 | 8/1998 | | |
| JP | 10-326610 | 12/1998 | | |
| JP | 11-007931 | 1/1999 | | |
| JP | 11-040203 | 2/1999 | | |
| JP | 11040203 A * | 2/1999 | ............ | H01M 10/42 |
| JP | 11-273651 | 10/1999 | | |
| JP | 11-307076 | 11/1999 | | |
| JP | 2000-082457 | 3/2000 | | |
| JP | 2000-182598 | 6/2000 | | |
| JP | 2001-202946 | 7/2001 | | |
| JP | 2001-357834 | 12/2001 | | |
| JP | 2002-216743 | 8/2002 | | |
| JP | 2003-051303 | 2/2003 | | |
| JP | 2003-051304 | 2/2003 | | |
| JP | 2003-092103 | 3/2003 | | |
| JP | 2003-178745 | 6/2003 | | |
| JP | 2003-197178 | 7/2003 | | |
| JP | 2003-223886 | 8/2003 | | |
| JP | 2003-308815 | 10/2003 | | |
| JP | 2004-022477 | 1/2004 | | |
| JP | 2004-087194 | 3/2004 | | |
| JP | 2004-521459 | 7/2004 | | |
| JP | 2004-273139 | 9/2004 | | |
| JP | 2004-319463 | 11/2004 | | |
| JP | 2005-032477 | 2/2005 | | |
| JP | 2006-012602 | 1/2006 | | |
| JP | 2008-027668 | 2/2008 | | |
| JP | 2008-177084 | 7/2008 | | |
| JP | 2008-186591 | 8/2008 | | |
| JP | 2008-218132 | 9/2008 | | |
| JP | 2009-105075 | 5/2009 | | |
| JP | 2010-033777 | 2/2010 | | |
| JP | 2010-097822 | 4/2010 | | |
| JP | 2011-018645 | 1/2011 | | |
| JP | 2011-124214 | 6/2011 | | |
| JP | 2011-154991 | 8/2011 | | |
| JP | 2011-210717 | 10/2011 | | |
| KR | 10-1999-0031054 U | 7/1999 | | |
| KR | 10-2001-0011900 | 2/2001 | | |
| KR | 10-2001-0021236 | 3/2001 | | |
| KR | 10-2006-0020211 | 3/2006 | | |
| KR | 10-2006-0039955 | 5/2006 | | |
| KR | 10-0693115 B1 | 3/2007 | | |
| KR | 10-2007-0122471 | 12/2007 | | |
| KR | 10-0870349 B1 | 11/2008 | | |
| KR | 10-2009-0097599 | 9/2009 | | |
| KR | 10-2010-0036164 | 4/2010 | | |
| KR | 10-2010-0052885 | 5/2010 | | |
| KR | 10-2010-0062886 | 6/2010 | | |
| KR | 10-2010-0076699 | 7/2010 | | |
| KR | 10-2010-0088021 | 8/2010 | | |
| KR | 10-2010-0099983 | 9/2010 | | |
| KR | 10-2010-0123598 | 11/2010 | | |
| KR | 10-2011-0005197 | 1/2011 | | |
| KR | 10-2011-0017820 | 2/2011 | | |
| KR | 10-2011-0030043 | 3/2011 | | |
| KR | 10-1042808 B1 | 6/2011 | | |
| KR | 10-2011-0136166 | 12/2011 | | |
| WO | WO 02/071510 A1 | 9/2002 | | |
| WO | WO 2007/126243 A1 | 11/2007 | | |

(56) References Cited

FOREIGN PATENT DOCUMENTS

OTHER PUBLICATIONS

Machine translation for Kuroda, JP 10-074500 A.*
European Search Report dated Aug. 19, 2010, for corresponding European Patent application 10167890.2, noting listed reference in this IDS, as well as JP 2004-319463, previously filed in an IDS dated Nov. 25, 2009.
SIPO Office action dated Apr. 12, 2013, for corresponding Chinese Patent application 201010135715.X, with English translation, (20 pages).
Japanese Office action dated Feb. 5, 2013, for corresponding Japanese Patent application 2010-154142, (2 pages).
Patent Abstracts of Japan, and English machine translation of Japanese Publication 07-201372 listed above, (5 pages).
EPO Search Report dated Oct. 13, 2010 for European Patent application 10169791, (6 pages).
EPO Office action dated Apr. 21, 2011 for European Patent application 10169791, (6 pages).
KIPO Office action dated Jan. 17, 2012 for Korean Patent application 10-2010-0068019, (9 pages).
KIPO Office action dated Mar. 19, 2012 for Korean Patent application 10-2010-0062270, (5 pages).
EPO Office action dated Feb. 8, 2011 for European Patent application 10168526.1, (4 pages).
EPO Search Report dated Aug. 16, 2010 for European Patent application 101685263.1, (6 pages).
EPO Search Report dated Feb. 29, 2012 for European Patent application 11165265.7, (5 pages).
KIPO Office action dated Aug. 13, 2012 for Korean Patent application 10-2011-0036267, (4 pages).
JPO Office action dated Jun. 4, 2013 for Japanese Patent application 2011-170959, (3 pages).
EPO Search Report dated Aug. 19, 2010 for European Patent application 10164550.5, (8 pages).
EPO Office action dated Mar. 7, 2011 for European Patent application 10164550.5, (5 pages).
EPO Search Report dated Aug. 17, 2011 for European Patent application 10164550.5, (8 pages).
EPO Office action dated Mar. 22, 2012 for European Patent application 10164550.5, (4 pages).
JPO Office action dated Aug. 28, 2012 for Japanese Patent application 2010-170281, (2 pages).
KIPO Notice of Allowance dated Oct. 26, 2012 for Korean Patent application 10-2010-0052011, (5 pages).
SIPO Office action dated Jan. 22, 2013, with English translation for Chinese Patent application 201010220632.0, (20 pages).
EPO Search Report dated Sep. 28, 2012 for European Patent application 12179697.3, (6 pages).
EPO Search Report dated Dec. 20, 2012 for European Patent application 12178835.0, ( pages).
EPO Search Report dated Oct. 2, 2012 for European Patent application 11178263.7, (7 pages).
SIPO Office action dated Aug. 6, 2013, with English translation for Chinese Patent application 201010135715.X, (20 pages).
SIPO Office action dated Jul. 15, 2013, with English translation for Chinese Patent application 201010220632.0, (10 pages).
U.S. Office action dated May 6, 2013, for cross reference U.S. Appl. No. 13/077,640, (17 pages).
U.S. Office action dated Feb. 1, 2013, for cross reference U.S. Appl. No. 12/781,656, (17 pages).
U.S. Office action dated Jul. 3, 2013, for cross reference U.S. Appl. No. 12/781,656, (15 pages).
Patent Abstracts of Japan, and English machine translation of Japanese Publication 07-037572, dated Feb. 7, 1995, (5 pages).
Patent Abstracts of Japan, and English machine translation of Japanese Publication 10-208725, Aug. 7, 1998, (10 pages).
Patent Abstracts of Japan, and English machine translation of Japanese Publication 10-326610, Dec. 8, 1998, (10 pages).
Patent Abstracts of Japan, and English machine translation of Japanese Publication 11-273651, Oct. 8, 1999, (12 pages).
Patent Abstracts of Japan, and English machine translation of Japanese Publication 2000-082457, Mar. 21, 2000, (13 pages).
Patent Abstracts of Japan, and English machine translation of Japanese Publication 2000-182598, Jun. 30, 2000, (21 pages).
Patent Abstracts of Japan, and English machine translation of Japanese Publication 2004-022477, Jan. 22, 2004, (7 pages).
Patent Abstracts of Japan, and English machine translation of Japanese Publication 2004-087194, Mar. 18, 2004, (10 pages).
Patent Abstracts of Japan, and English machine translation of Japanese Publication 2004-273139, Sep. 30, 2004, (24 pages).
Patent Abstracts of Japan, and English machine translation of Japanese Publication 2008-027668, Feb. 7, 2008, (13 pages).
Patent Abstracts of Japan, and English machine translation of Japanese Publication 2008-186591, Aug. 14, 2008, (14 pages).
Patent Abstracts of Japan, and English machine translation of Japanese Publication 2008-218132, Sep. 18, 2008, (10 pages).
Patent Abstracts of Japan, and English machine translation of Japanese Publication 2010-033777, Feb. 12, 2010, (16 pages).
U.S. Notice of Allowance dated Sep. 23, 2013, for cross reference U.S. Appl. No. 13/210,124, (15 pages).
SIPO Office action dated Aug. 27, 2012, for corresponding Chinese Patent application 201010135715.X, with English translation (16 pages).
Korean Letter of Patent dated Dec. 15, 2011, for corresponding Korean Patent application 10-2009-011665, noting Japanese reference previously submitted in an IDS dated Nov. 25, 2009, 11 pages.
European Search Report dated Apr. 20, 2011, for corresponding European Patent application 10167890.2.
Patent Abstracts of Japan, and English machine translation of Japanese Publication 5-62664 listed above, 11 pages.
Korean Patent Abstracts for Korean Publication 10-2008-0084416 dated Sep. 19, 2008, corresponding to Korean Patent 10-0870349 dated Nov. 25, 2008, listed above.
KIPO Office action dated Jun. 18, 2012 for Korean Patent application 10-2011-0003951, (4 pages).
KIPO Office action dated Oct. 8, 2012, for Korean Patent application 10-2011-0050510, (4 pages).
KIPO Office action dated Apr. 4, 2012, for Korean Patent application 10-2010-0062874, (5 pages).
KIPO Notice of Allowance dated Dec. 4, 2012, for Korean Patent application 10-2011-0003951, (5 pages).
KIPO Notice of Allowance dated Mar. 27, 2013, for Korean Patent application 10-2011-0050510, (5 pages).
EPO Search Report dated Dec. 14, 2012 for European Patent application 12160354.2, (5 pages).
EPO Search Report dated Sep. 29, 2011 for European Patent application 11169286.9, (5 pages).
EPO Office action dated Jul. 19, 2011 for European Patent application 10170406.2 (3 pages).
JPO Office action dated Apr. 30, 2013, for Japanese Patent application 2011-115662, (2 pages).
JPO Office action dated Sep. 24, 2013, for Japanese Patent application 2011-170959, (3 pages).
SIPO Office action dated May 19, 2014, with English translation, for corresponding Chinese Patent application 201110207662.2, (16 pages).
SIPO Office action dated Dec. 4, 2013, for Chinese Patent application 201110207662.2, (20 pages).
U.S. Office action dated Jun. 21, 2013, for cross reference U.S. Appl. No. 13/137,460, (25 pages).
U.S. Office action dated Dec. 21, 2012, for cross reference U.S. Appl. No. 12/656,085, (28 pages).
U.S. Office action dated Oct. 1, 2013, for cross reference U.S. Appl. No. 13/396,463, (15 pages).
U.S. Office action dated Oct. 8, 2013, for cross reference U.S. Appl. No. 13/563,028, (16 pages).
U.S. Office action dated Nov. 14, 2013, for cross reference U.S. Appl. No. 12/781,656, (20 pages).
U.S. Office action dated Nov. 21, 2013, for cross reference U.S. Appl. No. 13/077,640, ( pages).

(56) References Cited

OTHER PUBLICATIONS

U.S. Notice of Allowance dated Jan. 29, 2014, for cross reference U.S. Appl. No. 12/781,656, (7 pages).
U.S. Notice of Allowance dated Mar. 20, 2014, for cross reference U.S. Appl. No. 12/781,656, (14 pages).
U.S. Office action dated Apr. 8, 2014, for cross reference U.S. Appl. No. 13/396,463, (7 pages).
U.S. Notice of Allowance dated Apr. 30, 2014, for cross reference U.S. Appl. No. 13/563,028, (27 pages).
U.S. Office action dated May 6, 2011, for cross reference U.S. Appl. No. 12/634,000, (9 pages).
U.S. Office action dated Sep. 2, 2011, for cross reference U.S. Appl. No. 12/634,000, (14 pages).
U.S. Office action dated Jan. 9, 2012, for cross reference U.S. Appl. No. 12/634,000, (11 pages).
U.S. Notice of Allowance dated Apr. 13, 2012, for cross reference U.S. Appl. No. 12/634,000, (10 pages).
U.S. Office action dated Jun. 4, 2014, for cross reference U.S. Appl. No. 13/077,640, (25 pages).
U.S. Notice of Allowance dated Jun. 27, 2014, for cross reference U.S. Appl. No. 12/781,656, (7 pages).
Patent Abstracts of Japan, and English machine translation of Japanese Publication 05-251290, dated, (5 pages).
Patent Abstracts of Japan, and English machine translation of Japanese Publication 05-257088, dated, (6 pages).
Patent Abstracts of Japan, and English machine translation of Japanese Publication 08-050920, dated, (14 pages).
Patent Abstracts of Japan, and English machine translation of Japanese Publication 08-185850, dated, (11 pages), also Corresponds to U.S. Pat. No. 6,753,104 listed above.
Patent Abstracts of Japan, and English machine translation of Japanese Publication 10-188946, dated , (8 pages), also Corresponds to U.S. Pat. No. 7,666,544 listed above.
Patent Abstracts of Japan, and English machine translation of Japanese Publication 11-307076, dated, (6 pages).
Patent Abstracts of Japan, and English machine translation of Japanese Publication 2001-202946, dated , (8 pages).
Patent Abstracts of Japan, and English machine translation of Japanese Publication 2001-357834, dated , (15 pages).
Patent Abstracts of Japan, and English machine translation of Japanese Publication 2002-216743, dated, (10 pages).
Patent Abstracts of Japan, and English machine translation of Japanese Publication 2003-051304, dated , (19 pages).
Patent Abstracts of Japan, and English machine translation of Japanese Publication 2003-092103, dated , (18 pages).
Patent Abstracts of Japan, and English machine translation of Japanese Publication 2003-197178 dated Jul. 11, 2003, (12 pages).
Patent Abstracts of Japan, and English machine translation of Japanese Publication 2003-223886, dated , (10 pages).
Patent Abstracts of Japan, and English machine translation of Japanese Publication 2005-032477, dated, (21 pages).
Patent Abstracts of Japan, and English machine translation of Japanese Publication 2006-012602, dated , (10 pages).
Patent Abstracts of Japan, and English machine translation of Japanese Publication 2008-177084, dated , (11 pages).
Patent Abstracts of Japan, and English machine translation of Japanese Publication 2009-105075, dated , (10 pages).
Patent Abstracts of Japan, and English machine translation of Japanese Publication 2010-097822, dated , (24 pages).
Patent Abstracts of Japan, and English machine translation of Japanese Publication 2011-018645, dated Jan. 27, 2011, (15 pages).
U.S. Notice of Allowance dated Feb. 5, 2015, for cross reference U.S. Appl. No. 13/563,028, (8 pages).
KIPO Office action dated Nov. 20, 2012 corresponding to Korean Patent application 10-2011-0073880, (8 pages).
SIPO Office action dated Oct. 8, 2014, with English translation, for corresponding Chinese Patent application 201110207662.2, (18 pages).
SIPO Office action dated Dec. 22, 2014, with English translation, for corresponding Chinese Patent application 201010135715.X, (15 pages).
U.S. Notice of Allowability dated Aug. 19, 2014, for cross reference U.S. Appl. No. 12/781,656, (2 pages).
U.S. Notice of Allowance dated Aug. 28, 2014, for cross reference U.S. Appl. No. 13/563,028, (9 pages).
U.S. Notice of Allowance dated Dec. 4, 2014, for cross reference U.S. Appl. No. 13/563,028, (9 pages).
U.S. Notice of Allowance dated Dec. 19, 2014, for cross reference U.S. Appl. No. 13/333,869, (21 pages).
U.S. Office action dated Oct. 21, 2014, for cross reference U.S. Appl. No. 13/396,463, (27 pages).
U.S. Office action dated Nov. 24, 2014, for cross reference U.S. Appl. No. 13/077,640, (18 pages).
U.S. Office action dated Mar. 25, 2015, for cross reference U.S. Appl. No. 13/077,640, (18 pages).
SIPO Office action dated Mar. 25, 2015, with English translation, for Chinese Patent application 201010135715.X, (14 pages).
SIPO Office action dated Mar. 26, 2015, with English translation, for Chinese Patent application 201110207662.2, (6 pages).
U.S. Office action dated Apr. 23, 2015, for cross reference U.S. Appl. No. 13/396,463, (20 pages).
EPO Office action dated Aug. 14, 2015 for European Patent application 12178835.0, (5 pages).
SIPO Office action dated Jul. 6, 2015 for Chinese Patent application 201010135715.X, (10 pages).
SIPO Office action dated Oct. 10, 2015, with English translation, corresponding to Chinese Patent application 201210308716.9, (10 pages).
U.S. Office action dated Nov. 6, 2015, for cross reference U.S. Appl. 13/396,463, (20 pages).

* cited by examiner

RECHARGEABLE BATTERY WITH A CAP ASSEMBLY HAVING A FIRST TAB LOCATED OUTSIDE OF THE CASE

CROSS-REFERENCE TO RELATED APPLICATIONS

This application claims priority to and the benefit of U.S. Provisional Application No. 61/224,392, filed Jul. 9, 2009, the entire content of which is incorporated herein by reference.

BACKGROUND

1. Field

The described technology relates generally to a rechargeable battery.

2. Description of the Related Art

A rechargeable battery can be repeatedly charged and discharged, unlike a primary battery that is not intended to be recharged. A low capacity rechargeable battery is generally used for a small or portable electronic device, such as a mobile phone, a notebook computer, or a camcorder. A large capacity rechargeable battery is generally used as a power source for driving a motor for a hybrid electric vehicle.

When excessive heat is generated in the rechargeable battery or when the internal pressure increases as an electrolyte solution in the rechargeable battery is decomposed, the battery may explode or catch fire. In particular, in the case of a prismatic battery, it is not easy to provide a structure that cuts off or discharges current due to its specific characteristics of the terminal structure, compared to the cylindrical battery.

The above information disclosed in this Background section is only for enhancement of understanding of the background of the described technology and therefore it may contain information that does not form the prior art that is already known in this country to a person of ordinary skill in the art.

SUMMARY

The described technology of embodiments provides a rechargeable battery having an improved safety.

An exemplary embodiment according to the present invention provides a rechargeable battery including: an electrode assembly comprising a first electrode, a second electrode, and a separator between the first electrode and the second electrode; a case containing the electrode assembly; a cap assembly coupled to the case, the cap assembly comprising a cap plate and a deformable plate attached to the cap plate and configured to deform in response to an increase in pressure inside the case to electrically couple the first electrode and the second electrode to each other.

The deformable plate may be electrically coupled to the cap plate. For example, the deformable plate may be welded to the cap plate.

The cap assembly may further include a first tab located outside of the case and on the cap plate and electrically coupled to the first electrode, wherein the deformable plate is configured to contact the first tab when deformed.

The cap assembly may further include an insulating member between the first tab and the cap plate for electrically insulating the first tab from the cap plate.

The cap assembly may further include a first terminal electrically coupled to the first electrode and mounted on the cap plate, and a gasket electrically insulating the first terminal from the cap plate, wherein the first tab has an opening through which the first terminal protrudes from interior to exterior of the case.

The first tab may be fixed to the cap plate by an enlarged head of the first terminal or a nut coupled to the first terminal.

The cap plate may have an opening covered by the deformable plate, wherein the first tab includes a protrusion at least partly inserted into the opening.

The cap assembly may further include an insulating member between the protrusion and a peripheral wall defining the opening of the cap plate for electrically insulating the first tab from the cap plate.

The second electrode may be electrically coupled to the cap plate.

The cap assembly may further include a second terminal, and the second electrode may be electrically coupled to the second terminal.

The rechargeable battery may further include a gasket mounted in an opening on the cap plate, wherein the gasket electrically isolates the second terminal from the cap plate.

The rechargeable battery may further include a connection tab on the cap plate and electrically coupling the second terminal to the cap plate.

The deformable plate may be curved to protrude toward inside of the case.

The cap assembly may have a vent opening, and may further include a vent member mounted on the cap plate to cover the vent opening, and wherein the deformable plate is thicker than the vent member.

DESCRIPTION OF REFERENCE NUMERALS INDICATING SOME OF THE ELEMENTS IN THE DRAWINGS

| | |
|---|---|
| 10: electrode assembly | 11: positive electrode |
| 11a: positive uncoated region | 110: rechargeable battery |
| 12: negative electrode | 12a: negative uncoated region |
| 13: separator | 15: case |
| 16: cap plate | 16a: short hole |
| 20: cap assembly | 21: first terminal |
| 21a: negative electrode lead tab | 23: second terminal |
| 22, 23a: positive electrode lead tab | 29: connection tab |
| 41, 51: first short tab | 51a: short protrusion |
| 42, 52: reversing plate | 42a, 52a: adhesion region |
| 42b, 52b: deformation region | |

DETAILED DESCRIPTION

In the following description, a "reversing plate" can be any suitable plate that can be deformed by an increase in pressure, and the present invention does not particularly limit the shape. The reversible plate may also be referred to as a "deformable plate".

Hereinafter, exemplary embodiments of the present invention will be described in detail with reference to the accompanying drawings to enable those having ordinary skill in the art to which the present invention pertains to implement the technological concept of the present invention. However, the present invention may be implemented in various different ways and are not limited to the following exemplary embodiments. Like reference numerals designate like constituent elements throughout the specification.

Figure 1:
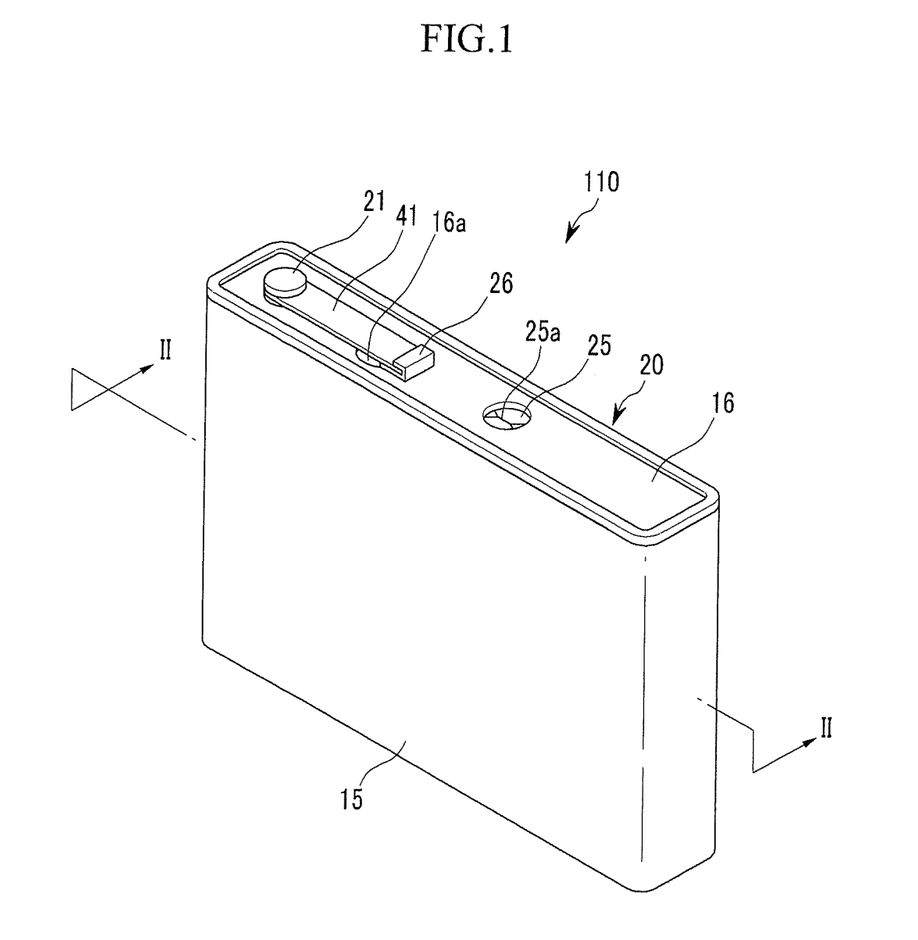
FIG. 1 is a perspective view showing a rechargeable battery in accordance with a first exemplary embodiment of the present invention.
Figure 2:
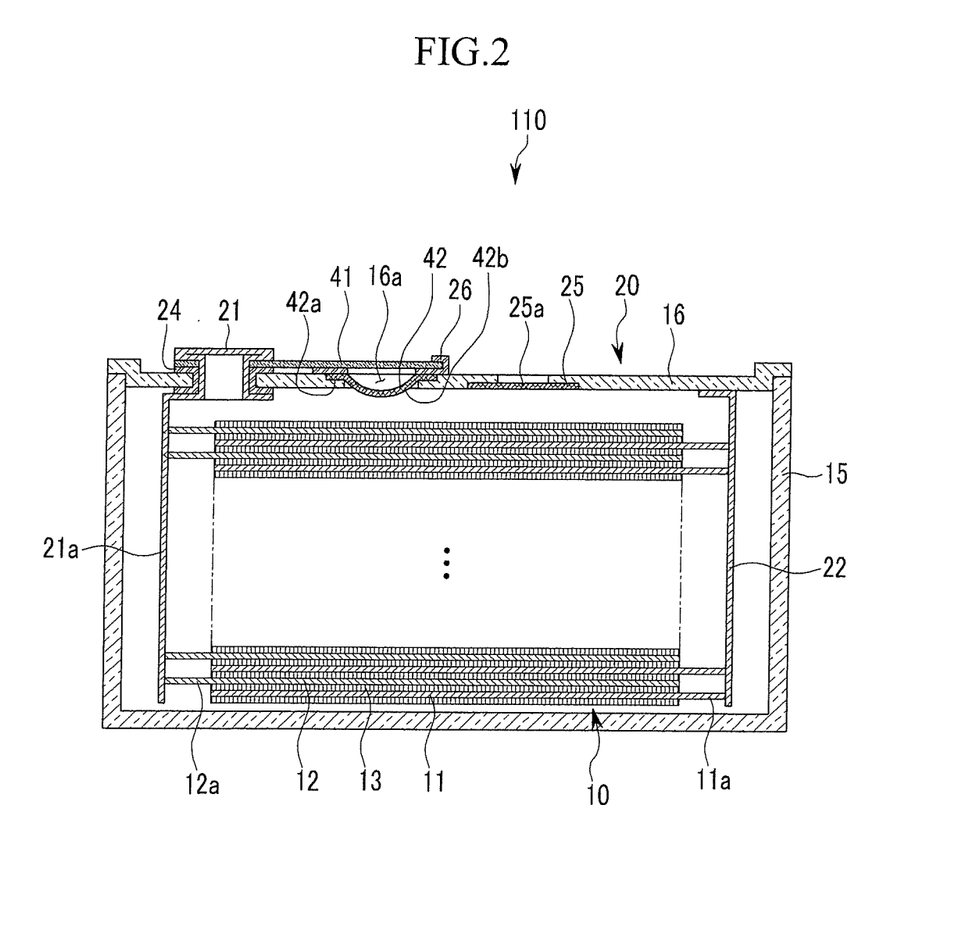
FIG. 2 is a cross-sectional view taken along the line II-II of FIG. 1.

FIG. 1 is a perspective view showing a rechargeable battery in accordance with a first exemplary embodiment of the present invention, and FIG. 2 is a cross-sectional view taken along the line II-II of FIG. 1.

Referring to FIGS. 1 and 2, a rechargeable battery 110 in accordance with a first exemplary embodiment includes an electrode assembly 10 formed by interposing a separator 13 as an insulator between a positive electrode 11 and a negative electrode 12, a case 15 in which the electrode assembly 10 is contained, and a cap assembly 20 connected to an opening of the case 15, thereby sealing the case.

The rechargeable battery 110 is a lithium ion secondary battery and will be described herein as a prismatic battery, for example. However, the present invention is not limited thereto, and may be applied to any suitable battery such as, for example, a lithium polymer battery or a cylindrical battery.

Each of the positive electrode 11 and the negative electrode 12 includes a coated region in which an active material is coated on a current collector formed of a thin metal foil. The positive electrode 11 and the negative electrode 12 also respectively include uncoated regions 11a and 12a in which the active material is not coated. Here, the negative electrode 12 may be referred to as a first electrode, the positive electrode 11 may be referred to as a second electrode, and vice versa.

As shown in FIG. 2, the positive uncoated region 11a is formed at one end of the positive electrode 11 along the longitudinal direction of the positive electrode 11, and a negative uncoated region 12a is formed at one end of the negative electrode 12 opposite to the positive uncoated region 11a along the longitudinal direction of the negative electrode 12. The positive electrode 11 and the negative electrode 12 are spirally wound with the separator 13 as an insulator interposed between the positive electrode 11 and the negative electrode 12.

However, the present invention is not limited thereto. For example, the electrode assembly 10 may have a structure in which a plurality of positive electrodes and a plurality of negative electrodes, respectively composed of a plurality of sheets, are stacked with a separator interposed therebetween.

The case 15 has a substantially cuboid shape having an opening side. The cap assembly 20 includes a cap plate 16 covering the opening of the case 15, a first terminal 21 protruding to the outside of the cap plate 16 and electrically connected to the negative electrode 12, and a first short tab 41 electrically connected to the first terminal 21 and mounted on the cap plate 16 with an insulating member 26 interposed therebetween. The first short tab 41 may also be referred to as a first tab, for example.

The cap plate 16 is formed of a thin plate, and a vent member (or vent plate) 25 having a notch 25a, which is configured to be broken by a predetermined internal pressure, is fixed to the cap plate 16. In the described embodiment, the vent member 25 has a substantially flat surface unlike the reversing plate 42. The vent member 25 is mounted on the cap plate on the side of the cap plate 16 facing the interior of the case 15. The cap plate 16 has a vent hole (or vent opening) surrounded by a depressed region around the vent hole. The vent member 25 is mounted on the depressed region of the cap plate 16 on the side facing the interior of the case 15, so as to cover the vent hole. The notch 25a is in an area of the vent member 25 overlapping the vent opening, such that the notch 25a is configured to break when the internal pressure reaches a level that is selected during the design of the secondary battery 110.

The cap assembly 20 includes a reversing plate 42 for short-circuiting the positive electrode 11 and the negative electrode 12 to each other. The reversing plate 42 short-circuits the first short tab 41 and a second short tab when the internal pressure of the rechargeable battery 110 increases. The reversing plate 42 of the first exemplary embodiment is fixedly mounted on the cap plate 16 such that the cap plate 16 serves as the second short tab.

A gasket 24 is interposed between the cap plate 16 and the first terminal 21 to insulate the cap plate 16 from the first terminal 21. The first terminal 21 is electrically connected to the negative electrode 12 via a negative electrode lead tab 21a, and the cap plate 16 is electrically connected to the positive electrode 11 via a positive electrode lead tab 22.

The first terminal 21 penetrates through the cap plate 16 to protrude from the interior of the case 15 to the outside of the case 15. The first short tab 41 has an opening through which the first terminal 21 protrudes. After the first short tab 41 is placed on the cap plate 16 with the first terminal 21 protruding therethrough, the top of the first terminal 21 is enlarged by applying pressure, and the first short tab 41 is fixed between the first terminal 21 and the gasket 24. That is, the first terminal 21 in accordance with the present exemplary embodiment is formed in a rivet shape. However, the present invention is not limited thereto. In other embodiments, for example, the first terminal 21 and the first short tab 41 may be fixed to each other by fastening a nut to the first terminal 21.

The first short tab 41 has a substantially plate shape and is located on the cap plate 16. The cap plate 16 has an opening 16a that is covered by the reversing plate 42 and through which the curved (or downwardly convex) surface of the reversing plate 42 extends into the case 15. The cap plate 16 has a depressed portion around the opening, and the adhesion region 42a of the reversing plate 42 is mounted on the depressed portion of the cap plate 16. When the reversing plate 42 is deformed (e.g., to be upwardly convex), the reversing plate 42 makes a contact with the first short tab 41, thereby creating a short between the positive and negative electrodes 11 and 12. In the described embodiment, the opening 16a, which may also be referred to as a short hole, is larger than the vent opening covered by the vent member 25.

When the internal pressure of the rechargeable battery 110 increases, the deformation region 42b curved downwardly is reversed upwardly to contact the first short tab 41, and thereby the positive electrode 11 and the negative electrode 12 are short-circuited with each other.

As such, according to the first exemplary embodiment, when the internal pressure of the rechargeable battery 110 excessively increases as the temperature increases or as an electrolyte solution is decomposed, the deformation region 42b causes a short circuit, thus preventing the rechargeable battery 110 from exploding or catching fire. Because the pressure at which the reversing plate 42 is deformed can be adjusted by changing its thickness and shape, it is possible to accurately set the pressure that causes a short circuit.

In one embodiment, both the reversing plate 42 and the vent member 25 may be made of aluminum or other suitable metal, the thickness of the reversing plate 42 may be 0.4 mm, and the thickness of the vent member 25 may be 0.1 mm. The size of the hole for the reversing plate 42 may be larger than that of the vent hole, and therefore the ranges of operating pressure are different from each other. For example, the range of operating pressure may be between about 3 atm and about 4 atm for the reversing plate and between about 5 atm and about 6 atm for the vent member. This way, the reversing plate would be deformed prior to when the notch 25*a* would break.

In the embodiment of FIGS. 1 and 2, because the space in which the reversing plate 42 contacts the first short tab 41 is separated from the space in which the electrolyte solution is located, it is possible to prevent the electrolyte solution from catching fire due to flame or heat generated during the short circuit. Because a large current flows instantaneously when the short circuit occurs, the internal temperature of the battery may significantly increase if the short circuit region is located inside the case 15. However, according to the present exemplary embodiment, the first short tab 41 is located outside the case 15 such that heat can be dissipated to the outside through the first short tab 41, and thus it is possible to prevent heat from being excessively accumulated inside the case 15.

When a pressing force is continuously applied to an elastic member such as a spring, its elasticity may be reduced or eliminated after a long period of time. In order to ensure safety with respect to the cycle-life of the rechargeable battery 110, it is desirable that the elastic member does not lose its elasticity during the use of the rechargeable battery 110 and operates at a predetermined pressure. According to the described exemplary embodiment, the reversing plate 42 does not undergo an elastic deformation under a normal inner pressure, and thus the reversing plate 42 can operate at the predetermined pressure even after the lapse of a considerable amount of time.

Figure 3:
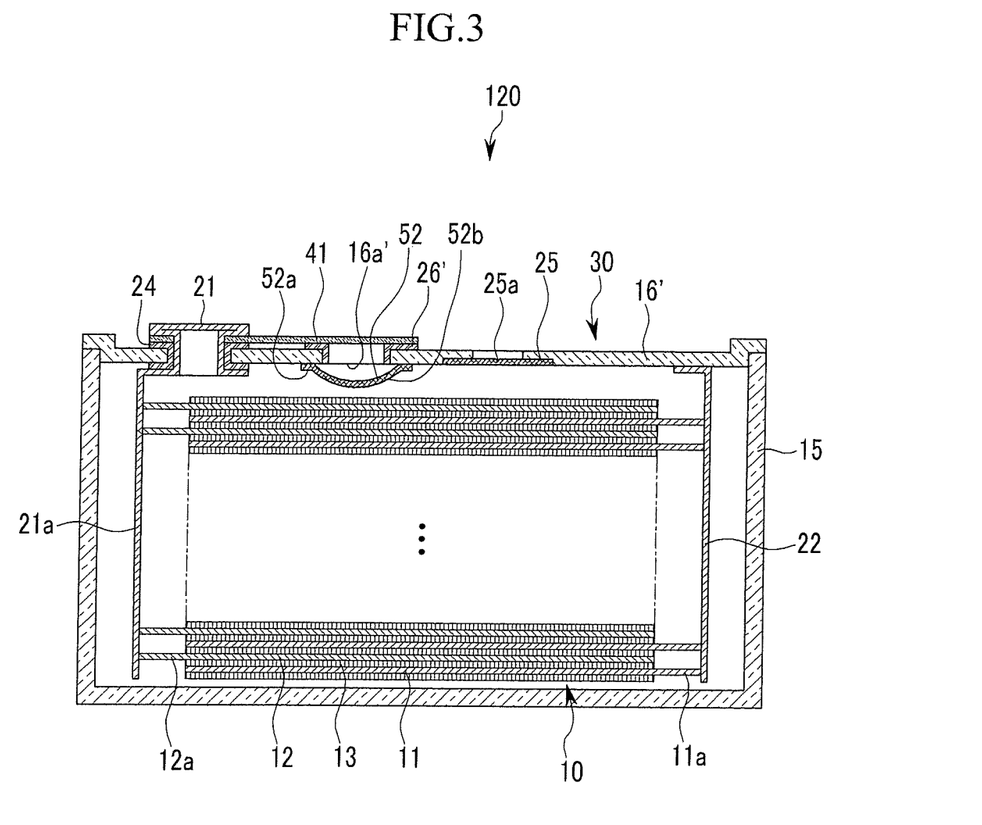
FIG. 3 is a cross-sectional view showing a rechargeable battery in accordance with a second exemplary embodiment of the present invention.

FIG. 3 is a cross-sectional view showing a rechargeable battery in accordance with a second exemplary embodiment of the present invention.

Referring to FIG. 3, a rechargeable battery 120 in accordance with the second exemplary embodiment has substantially the same structure as the rechargeable battery 110 of FIG. 2 except for a cap assembly 30, and therefore repeated description of the same elements will be omitted.

As shown in FIG. 3, the cap assembly 30 in accordance with the second exemplary embodiment includes a reversing plate 52 that is completely inside the case 15. The reversing plate 52 includes a deformation region 52*b* that is downwardly convex toward the inside of the case 15 and an adhesion region 52*a* that is attached to the side of the cap plate 16' that faces the interior of the case 15. The reversing plate 52 covers an opening (i.e., short hole) 16*a*' on the cap plate 16'. The first short tab 41 also covers the opening 16*a*' at the other side of the cap plate 16'. The first short tab 41 is separated from the cap plate 16' by an insulating member 26', which performs substantially the same function as the insulating member 26 of FIG. 2, but has a different shape. In the second embodiment, the insulating member 26' includes a portion that covers the inner wall that defines the opening 16*a*', and does not have a portion that partially covers the top of the first short tab 41.

The reversing plate 52 is located below the opening 16*a*' and has the adhesion region 52*a* adhered to the lower surface (i.e., side facing interior of the case 15) of the cap plate 16' by welding and the deformation region 52*b* formed inside the adhesion region 52*a* and protruding in an arc shape (i.e., convex downwardly) toward the electrode assembly 10. Therefore, the reversing plate 42 is electrically connected to the positive electrode 11 through the cap plate 16'.

When the reversing plate 52 is deformed by an increase in the internal pressure of the rechargeable battery 120, as the positive electrode 11 is electrically connected to the reversing plate 52 via the cap plate 16', and the first terminal 21 is electrically connected to the reversing plate 52 via the first short tab 41, the positive electrode and the negative electrode are electrically connected with each other, thereby causing a electrical short-circuit between the first and second electrodes.

Figure 4:
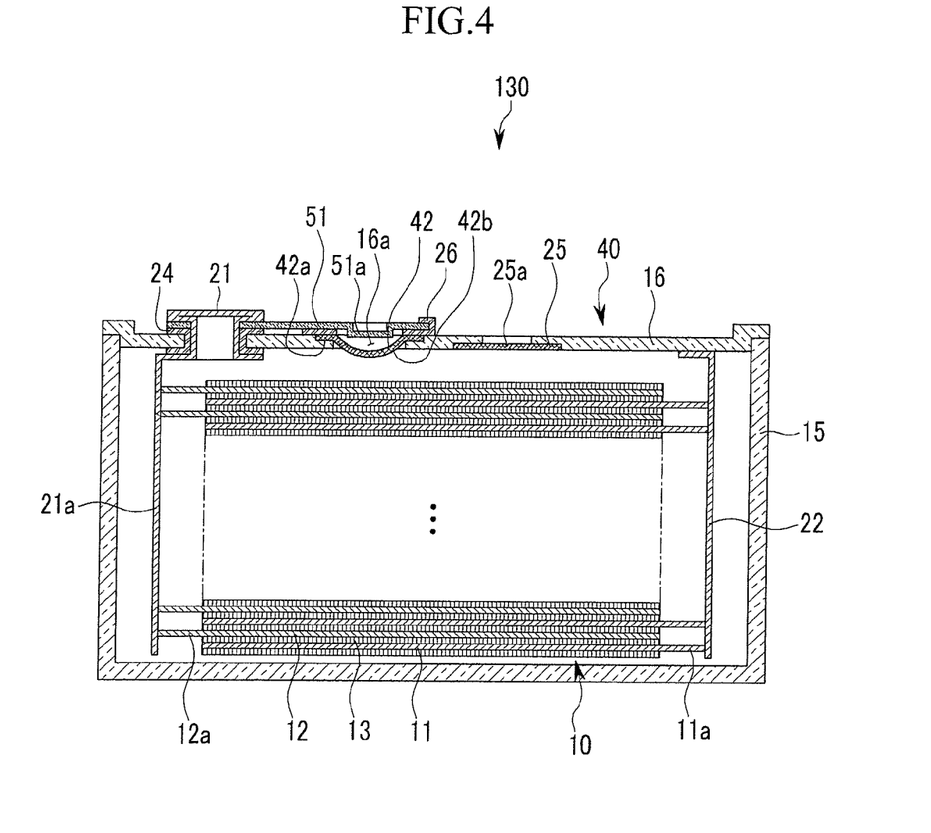
FIG. 4 is a cross-sectional view showing a rechargeable battery in accordance with a third exemplary embodiment of the present invention.

FIG. 4 is a cross-sectional view showing a rechargeable battery in accordance with a third exemplary embodiment of the present invention.

Referring to FIG. 4, a rechargeable battery 130 in accordance with the third exemplary embodiment has substantially the same structure as the rechargeable battery 110 of FIG. 2 except for a cap assembly 40, and therefore repeated description of the same elements will be omitted.

The rechargeable battery 130 in accordance with the present exemplary embodiment includes a case 15 and a cap assembly 40 closing and sealing the case 15. The cap assembly 40 includes a first terminal 21 electrically connected to a negative electrode 12, a first short tab 51 having a short protrusion 51*a* electrically connected to the first terminal 21 and inserted into a short hole 16*a*, and a reversing plate 42 placed on the depressed region of the cap plate 16 around the short hole 16*a* and covering the short hole 16*a*. The deformable region 42*b* of the reversing plate 42 protrudes through the short hole 16*a*, such that a downwardly convex portion of the reversing plate 42 is inside the case 15. Because of the short protrusion 51*a*, it is easier for the reversing plate 42 to be electrically coupled to the first short tab 51 through deformation in response to the internal pressure increase, as compared to the embodiment of FIG. 2. The cross-section of the protrusion 51*a* may have a circular shape or a suitable polygonal shape such as a square or a pentagon.

Figure 5:
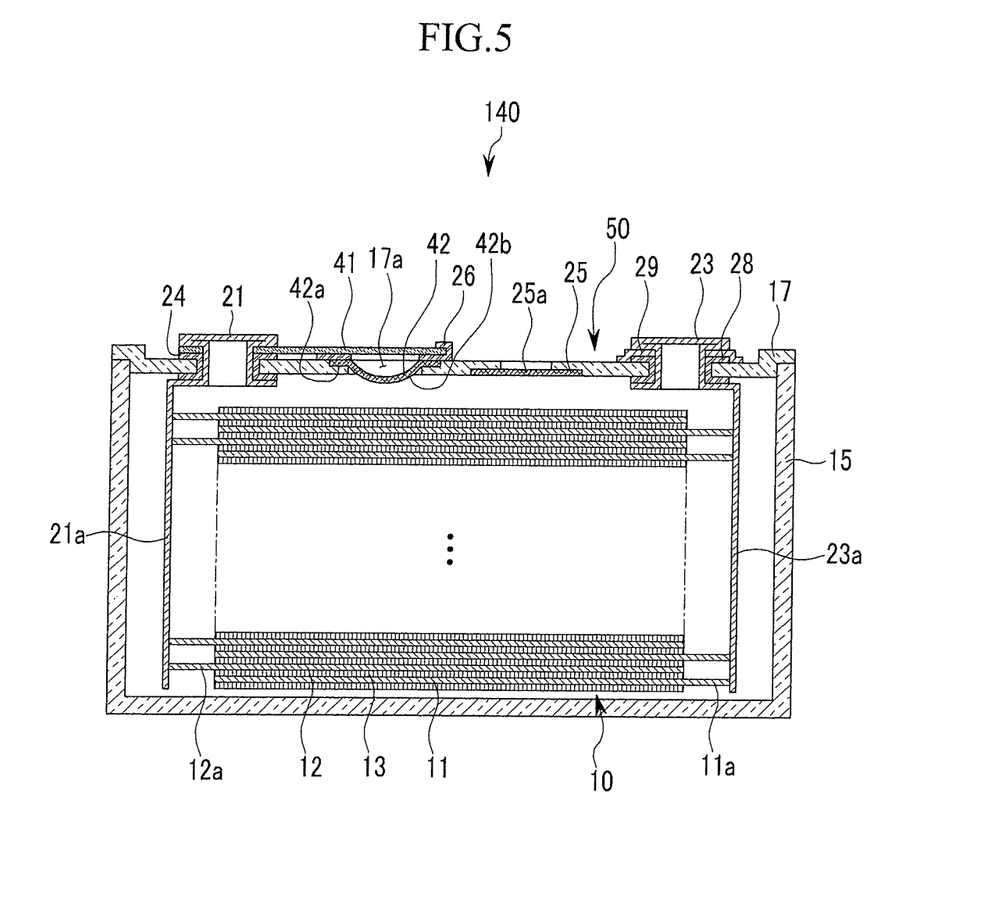
FIG. 5 is a cross-sectional view showing a rechargeable battery in accordance with a fourth exemplary embodiment of the present invention.

FIG. 5 is a cross-sectional view showing a rechargeable battery in accordance with a fourth exemplary embodiment of the present invention.

Referring to FIG. 5, a rechargeable battery 140 in accordance with the fourth exemplary embodiment has substantially the same structure as the rechargeable battery 110 of FIG. 2 except for a cap assembly 50, and therefore repeated description of the same elements will be omitted.

The rechargeable battery 140 in accordance with the present exemplary embodiment includes a case 15 and the cap assembly 50 closing and sealing the case 15. The cap assembly 50 includes a cap plate 17 connected to an opening of the case 15, a first terminal 21 electrically connected to a negative electrode 12, and a second terminal 23 electrically connected to a positive electrode 11. A first short tab 41 is mounted on the cap plate 17 with the first terminal 21 protruding therethrough, and also covers a short hole 17*a* on the cap plate 17.

A gasket 28 for sealing the second terminal 23 and the cap plate 17 is interposed therebetween, and a connection tab 29 for electrically connecting the cap plate 17 and the second terminal 23 is mounted on the cap plate 17 around the second terminal 23. The connection tab 29 has an opening through which the second terminal 23 protrudes and is fixed between the second terminal 23 and the cap plate 17.

The first terminal 21 and the second terminal 23 are located near respective ends (or edges) of the cap plate 17 along the longitudinal direction.

When the internal pressure of the rechargeable battery 140 increases, the reversing plate 42 is deformed to be curved upwardly to electrically connect the first short tab 41 and the cap plate 17, thus causing a short circuit between the positive and negative electrodes 11 and 12. In addition, the notch 25a is broken when the internal pressure further increases, thus discharging internal gas to the outside.

As such, according to the present exemplary embodiment, because the positive and negative electrodes 11 and 12 are electrically connected to each other at a predetermined internal pressure, it is possible to prevent the rechargeable battery 140 from exploding due to an increase in the internal pressure and, because the first short tab 41 is located outside the case 15, it is possible to prevent heat from being excessively generated in the rechargeable battery 140 due to a short circuit current.

Furthermore, because the first short tab 41 is located outside the case 15, heat can be easily dissipated to the outside through the first short tab 41. Also, because the short circuit region is located separately from the electrolyte solution, it is possible to prevent the electrolyte solution from catching fire.

Figure 6:
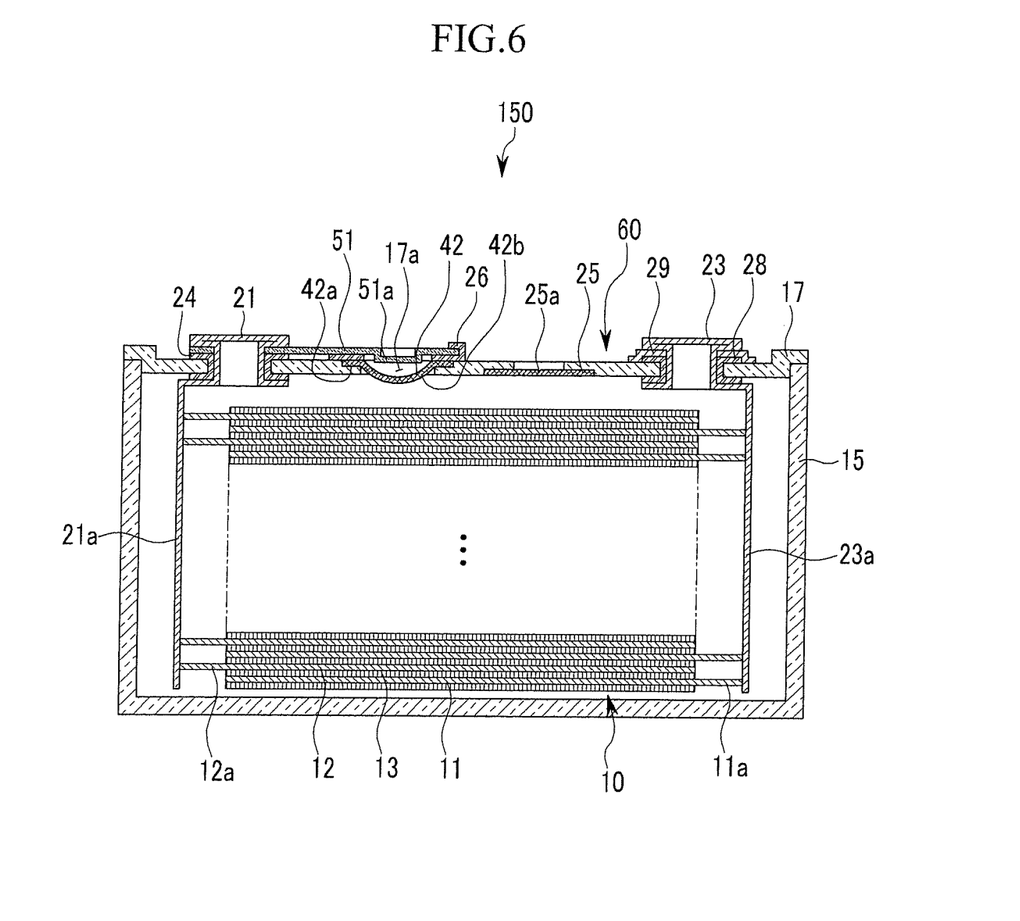
FIG. 6 is a cross-sectional view showing a rechargeable battery in accordance with a fifth exemplary embodiment of the present invention.

FIG. 6 is a cross-sectional view showing a rechargeable battery in accordance with a fifth exemplary embodiment of the present invention.

Referring to FIG. 6, a rechargeable battery 150 in accordance with the fifth exemplary embodiment has substantially the same structure as the rechargeable battery 140 of FIG. 5 except for a cap assembly 60, and therefore repeated description of the same elements will be omitted.

The rechargeable battery 150 in accordance with the present exemplary embodiment includes a case 15 and the cap assembly 60 closing and sealing the case 15. The cap assembly 50 includes a cap plate 17 connected to an opening of the case 15, a first terminal 21 electrically connected to a negative electrode 12, and a second terminal 23 electrically connected to a positive electrode 11. A first short tab 51 is mounted on the cap plate 17 and has an opening through which the first terminal 21 protrudes. The first short tab 51 has a short protrusion 51a electrically connected to the first terminal 21 and inserted into a short hole 17a, and a reversing plate 42 placed on the depressed region of the cap plate 16 around the short hole 16a and covering the short hole 17a. The deformable region 42b of the reversing plate 42 protrudes through the short hole 17a, such that a downwardly convex portion of the reversing plate 42 is inside the case 15.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A rechargeable battery comprising:
   an electrode assembly comprising a first electrode, a second electrode, and a separator between the first electrode and the second electrode;
   a case containing the electrode assembly; and
   a cap assembly coupled to the case, the cap assembly comprising a first tab located outside of the case and electrically coupled to the first electrode, a cap plate, and a deformable plate attached to the cap plate and configured to contact the first tab in response to an increase in pressure inside the case to electrically couple the first electrode and the second electrode to each other, wherein the cap plate is electrically coupled to the second electrode, and wherein at least a portion of the deformable plate protrudes from a surface of the cap plate to be inside the case.

2. The rechargeable battery of claim 1, wherein the deformable plate is electrically coupled to the cap plate.

3. The rechargeable battery of claim 2, wherein the deformable plate is welded to the cap plate.

4. The rechargeable battery of claim 1, wherein the cap assembly further comprises an insulating member between the first tab and the cap plate for electrically insulating the first tab from the cap plate.

5. A rechargeable battery comprising:
   an electrode assembly comprising a first electrode, a second electrode, and a separator between the first electrode and the second electrode;
   a case containing the electrode assembly; and
   a cap assembly coupled to the case, the cap assembly comprising a first tab located outside of the case and electrically coupled to the first electrode, a cap plate, and a deformable plate attached to the cap plate and configured to contact the first tab in response to an increase in pressure inside the case to electrically couple the first electrode and the second electrode to each other, wherein the cap assembly further comprises a first terminal electrically coupled to the first electrode and mounted on the cap plate, and a gasket electrically insulating the first terminal from the cap plate, wherein the first tab has an opening through which the first terminal protrudes from interior to exterior of the case.

6. The rechargeable battery of claim 5, wherein the first tab is fixed to the cap plate by an enlarged head of the first terminal or a nut coupled to the first terminal.

7. The rechargeable battery of claim 1, wherein the cap plate has an opening covered by the deformable plate, wherein the first tab comprises a protrusion at least partly inserted into the opening.

8. The rechargeable battery of claim 7, wherein the cap assembly further comprises an insulating member between the protrusion and a peripheral wall defining the opening of the cap plate for electrically insulating the first tab from the cap plate.

9. The rechargeable battery of claim 1, wherein the cap assembly further comprises a second terminal, and the second electrode is electrically coupled to the second terminal.

10. The rechargeable battery of claim 9, further comprising a gasket mounted in an opening on the cap plate, wherein the gasket electrically isolates the second terminal from the cap plate.

11. A rechargeable battery comprising:
    an electrode assembly comprising a first electrode, a second electrode, and a separator between the first electrode and the second electrode;
    a first terminal electrically coupled to the first electrode;
    a second terminal electrically coupled to the second electrode;
    a case containing the electrode assembly;
    a cap assembly coupled to the case, the cap assembly comprising a first tab located outside of the case and electrically coupled to the first electrode, a cap plate, and a deformable plate attached to the cap plate and configured to contact the first tab in response to an increase in pressure inside the case to electrically couple the first electrode and the second electrode to each other; and
    a connection tab on the cap plate and electrically coupling the second terminal to the cap plate.

12. The rechargeable battery of claim 1, wherein the deformable plate is curved to protrude toward inside of the case.

* * * * *